Sept. 19 3,343,023

CATHODE-RAY TUBE HAVING AN IMPROVED FIBER OPTIC FACE PLATE

Filed Nov. 4, 1964

INVENTOR
FREDERIC L. BISHOP
BY Philip M. Rice
& W. A. Schaich
ATTORNEYS

United States Patent Office 3,343,023
Patented Sept. 19, 1967

3,343,023
CATHODE-RAY TUBE HAVING AN IMPROVED
FIBER OPTIC FACE PLATE
Frederic L. Bishop, Toledo, Ohio, assignor to Owens-Illinois, Inc., a corporation of Ohio
Filed Nov. 4, 1964, Ser. No. 408,985
5 Claims. (Cl. 313—92)

ABSTRACT OF THE DISCLOSURE

This invention relates to an improved cathode-ray picture tube, and more specifically to a high resolution face plate member for such tube having a plurality of visible-light developing and transmitting fiber optic elements disposed in parallel array and comprised of a luminescent glass composition, the light-developing ends of said fiber optic elements being crystallized into luminescent crystals formed from said glass composition.

---

This invention relates generally to a face plate for a cathode-ray tube or similar device. More particularly, this invention relates to a face plate having vastly improved resolution as compared with the resolution of commercial cathode-ray tube face plates. The face plate of the present invention is assembled from fibers having core parts formed of glass or similar material having a relatively high index of refraction which are encircled by a cladding material having a relatively low index of refraction.

Cathode-ray tubes utilizing fiber optic face plates have been previously proposed as may be seen by reference to any of the following United States Patents: 2,996,634, 3,060,789, 3,139,340 and 3,141,105. However, the prior art fiber optics face plates, while adequate for many purposes, all suffer from a common deficiency, to wit: They all require a separate phosphor screen. Thus, in the cathode-ray tube art, it is well known to provide a face plate having a light-receiving surface disposed internally of the tube and a light-emitting surface disposed externally of the tube and to coat the light-receiving internal surface with a phosphor which will luminesce (i.e. emit photons) upon being subjected to an energizing radiation. Most present cathode-ray tubes coat the light-receiving surface of a face plate with a polycrystalline phosphor prepared by sintering powdered inorganic reactants selected to provide the necessary host and activator components. The resulting aggregates are ground or otherwise comminuted to a particle size of about 1 to 20 microns and then deposited on a substrate. Organic materials are often used as binders to obtain more uniform phosphor deposition or as membrane coatings for the phosphor to provide a surface which can be aluminized. Several disadvantages attend these processes: Comminution adversely effects the luminescent efficiency of the phosphors; the phosphors' inherent sensitivity to deterioration by chemical attack is enhanced by their large surface-to-volume ratio when powdered; uniform contact among phosphor particles and with the substrate is difficult to achieve, and inadequate contact causes light scattering which decreases effective output and resolution; phosphor coatings have little abrasion resistance, and binders used in their preparation are subject to thermal deterioration; and, of course, product fabrication techniques are limited to those which do not adversely effect the sensitive phosphor screens. Additionally, in cathodoluminescence devices, the excitation current must be kept below levels, usually low, which damage the phosphor.

The present invention overcomes the foregoing difficulty by completely eliminating the necessity of applying a phosphor coating to the light-receiving surface of the face plate. Accordingly, it is an object of the present invention to provide a cathode-ray tube face plate which is not subject to the foregoing difficulties.

It is another object of the present invention to provide a fiber optic cathode-ray tube face plate without a phosphor coating.

It is an additional object of the present invention to provide a fiber optic face plate in which the constituent causing luminescence is an integral part of the cores of said fibers.

A still further object of the present invention is to provide a face plate capable of transmitting an image having a relatively high degree of resolution as compared with that on conventional face plates.

Under one embodiment of the present invention, the high refractive index core glass is formed of transparent luminescent glass. As a result, the energizing radiation directed against the light-receiving surface of such face plate is converted to luminescent emission by the fibers themselves without the necessity of relying upon a separate coating. Under another embodiment of the present invention, the core glass is formed of a material which may be surface crystallized by devitrification and which is characterized by the crystals being luminescent. Under this embodiment, the major portion of the individual fiber remains vitreous and light-transmitting through its axial extent.

Other objects and advantages of the present invention will become readily apparent from the following detailed description taken in conjunction with the annexed sheet of drawings on which:

Figure 3:
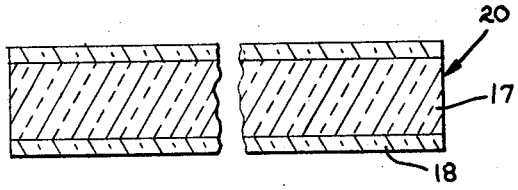
FIGURE 3 is a greatly enlarged sectional view of a single light-producing and light-conducting fiber of the type embodying the present invention.
Figure 2:
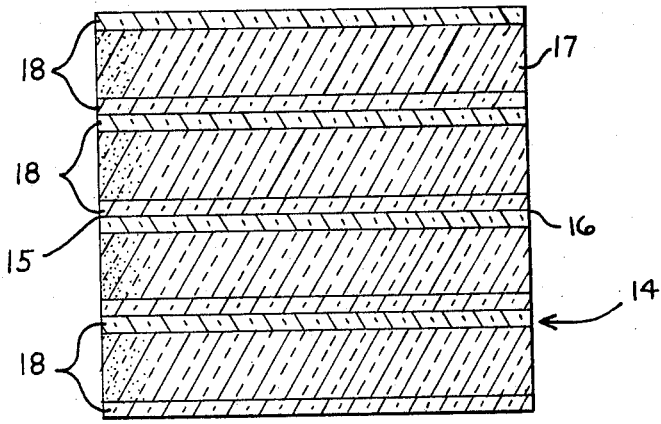
FIGURE 2 is an enlarged vertical sectional view of a portion of said face plate in which the ends of the fiber cores have been devitrified to a phosphor.
Figure 1:
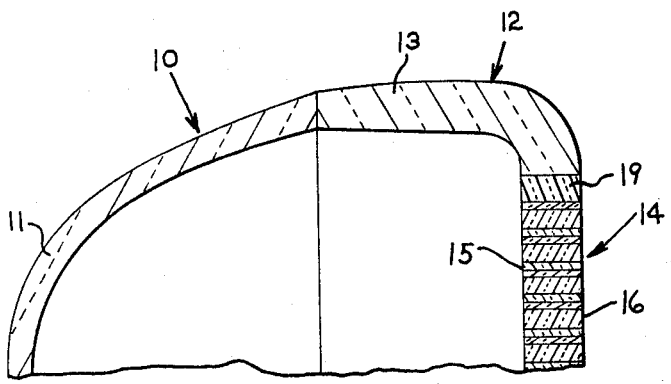
FIGURE 1 is a vertical sectional view of a fragmentary portion of a cathode-ray tube utilizing the face plate of the present invention.

Referring to the drawings, there is illustrated a fragmentary portion of a cathode-ray tube generally designated by the numeral 10 having a funnel member 11 and a face plate member 12. The face plate member 12 includes an annular flange portion 13 and viewing portion 14. Viewing portion 14 has an inner image-forming surface 15 and an outer image-viewing surface 16, and comprises a plurality of light-conducting fibers 20 bundled together in an ordered array as is well known in the art. Each of the fibers 20 includes a core portion 17 of a material as hereinafter described having a relatively high index of refraction. Each core portion 17 has a relatively thin outer coating or cladding 18 of a material having a relatively low index of refraction. The viewing portion 14 may be secured to the surrounding annular flange portion 13 by any desired adhesive means capable of withstanding the stresses resulting from vacuumizing the cathode-ray tube 10. For example, a solder glass 19 of the type described in U.S. Patent No. 3,127,278 may be utilized. Under one embodiment of the present invention, the core portion 17 is formed of a luminescent glass. Under another embodiment, the core portion is formed of a glass which is capable of having its surface devitrified to a phosphor. Under this embodiment, the ends of the filaments or cores on the image-forming surface 15 are devitrified to a phosphor so that the end of each core will convert radiant energy to luminescent emission which is then carried through the core to the image-viewing surface 16.

EXAMPLE I

This example describes the preparation of a face plate having the core portion transparent throughout its length from the image-forming surface 15 to the image-viewing surface 16, where the glass forming said core portion is cathodoluminescent. Initially, a batch of a composition conforming to that of the following table was melted at a temperature of 2660° F. for 22 hours and was cast into a rod approximately one inch (1″) in diameter.

*Composition*

| Component: | Percentage |
|---|---|
| $B_2O_3$ | 2.3 |
| $SiO_2$ | 63.5 |
| BaO | 17.2 |
| $Na_2O$ | 4.5 |
| $K_2O$ | 10.4 |
| CuO | 0.8 |
| $Al_2O_3$ | 1.4 |

Glass of the above composition had a refractive index of 1.529. The rod thus formed was then placed in a length of glass tubing having a complementary bore, which tubing served as the cladding. The glass used for the cladding had a refractive index of 1.49. This core-cladding unit was then heated and drawn to a diameter of approximately 0.020 inch.

The fibers thus formed were assembled side by side in parallel relationship into a bundle or series approximately 1¼″ in diameter. The bundle was then heated and drawn until the cores of the individual fibers had a diameter between 0.001 inch and 0.0005 inch. It should be understood, however, that the above core sizes are intended only as illustrations and should not be construed as limitations. The desired resolution forms the only limitation as to core size. A plurality of the drawn bundles or series containing the redrawn fibers were assembled side by side in parallel relationship into a body having a cross-sectional size and configuration corresponding to that desired for the viewing portion 14. The assemblage was then sintered to bond the fibers together and cut in parallel planes substantially normal to the longitudinal axes of the individual fibers to form a plate having a thickness of approximately ¼″ to ½″ between the image-forming surface 15 and the image-viewing surface 16. The respective surfaces were then ground smooth.

EXAMPLE II

A similar procedure was followed with glass having the following composition. This glass, like that of Example I, is luminescent and was used in forming the core portion of the fibers.

*Composition*

| Component: | Percentage |
|---|---|
| $SiO_2$ | 61.2 |
| $Al_2O_3$ | 18.8 |
| CaO | 11.4 |
| MgO | 8.0 |
| TbO | 0.5 |

The refractive index of the glass thus formed is 1.55. This glass was used with a cladding glass having a refractive index of 1.48.

EXAMPLE III

The following example represents a glass composition which was used as the core portion of fibers which were then assembled into a viewing portion for the face plate according to the above-identified procedure. The image-forming surface 15 was then subjected to surface devitrification of the core portion to form phosphor as will be described presently.

*Composition*

| Component: | Percentage |
|---|---|
| $SiO_2$ | 51.664 |
| ZnO | 29.81 |
| $Na_2O$ | 11.922 |
| CaO | 1.987 |
| MnO | 0.496 |
| $Sb_2O_3$ | 1.149 |
| $Li_2O$ | 1.987 |
| MgO | 1.987 |

Glass of the above-identified composition had a refractive index of 1.58 and was utilized with a cladding having a refractive index of 1.52. In order to devitrify or crystallize the ends of the fiber core portions at the image-forming surface 15, the face plate viewing portion 14 was heated to approximately 300 to 400° F. and its surface 15 sprayed with a 1% solution of zinc acetate and methanol. The sample was then cooled to room temperature and heat treated for eight hours at 1150° F. whereupon the surface became crystallized.

Face plates formed according to each of the above examples were then subjected to bombardment from a demountable cathode-ray tube system. The face plate formed in Example I emitted a deep blue color; Example II emitted a pale green color; and Example III emitted a green color.

The following table gives a comparison between light output characteristics, when subjected to bombardment of the face plate of Examples I through III as compared with bulk glass of the same composition.

RELATIVE LIGHT OUTPUT.—(In Foot Lamberts)

| | Sample | Description | Size | Voltage (kv.) | Current Density, μa./sq. in. | Light Output (Foot Lamberts) |
|---|---|---|---|---|---|---|
| Example I | 1 | Fiber Optic Face Plate | ⅜″ Dia. x ½″ | 15 | 80 | 36 |
| Do | 2 | Bulk Face Plate | ⅜″ Dia. x ½″ | 15 | 80 | 34 |
| Example II | 3 | Fiber Optic Face Plate | ¾″ Dia. x ¼″ | 15 | 80 | 16 |
| Do | 4 | Bulk Face Plate | ⅜″ Dia. x ¼″ | 15 | 80 | 11 |
| Example III | 5 | Fiber Optic Face Plate | ¾″ Dia. x ¼″ | 20 | 600 | 67 |
| Do | 6 | Bulk Face Plate | 1″ sq/ x ¼″ | 20 | 600 | 105 |

Face plates formed according to the above examples are admirably well suited for use where high resolution is required and where it is undesirable to utilize a separate phosphor screen.

Thus, the above-identified table illustrates the characteristic of a fiber optic cathode-ray tube face plate utilizing luminescent glass as the core material or, in the alternative, of utilizing as the core material a glass which is capable of having its surface devitrified to form a phosphor. A comparison of samples No. 1 and No. 2 which show respectively a fiber optic face plate and a non-fiber optic face plate formed of the same material, having the same dimensions and subjected to electron bombardment of the same intensity (80 microamperes per square inch) it can be seen that the light output in Foot Lamberts was virtually the same even though the area of image transfer was considerably reduced as a result of cladding. However, as is obvious, the resolution of the fiber optic face plate is much greater than the non-fiber optic face plate due to the conduction of internally-created light being conducted through each filament with very little "cross-talk" between adjacent filaments.

It is also significant that a cathode-ray tube having a separate phosphor layer will be damaged if subjected to current densities approaching the densities to which the present samples were subjected. Normally, a cathode-ray tube having a separate phosphor layer is bombarded with a current density of approximately 1 microampere as compared with the 80 to 600 microamperes to which the samples of the present invention were subjected.

Numerous modifications of the present invention will become readily apparent to those skilled in the art. Obviously, many different glass compositions may be utilized for the core glass other than those cited in the above examples. For example, any glass having the required properties of luminescence or of surface devitrification to form a phosphor will work satisfactorily for the present invention. Additionally, in its broader scope, it is quite possible to form luminescent crystals that are sufficiently transparent to permit devitrification of the entire core rather than just the surface as outlined in Example III. To accomplish this, the final heat treatment at 1150° F. is extended for a much longer period than eight hours, for example on the order of 500 hours. Accordingly, it is not the intention to limit the present invention otherwise than required by the appended claims.

I claim:

1. In a fiber optical image transfer device comprising a plurality of light-conducting optical fibers secured together in side-by-side relation so that corresponding opposite ends of the fibers cooperate to define respective radiation-receiving and light-emitting faces, each of said fibers having a core part of a transparent material of relatively high index of refraction and a cladding of relatively low index of refraction, the improvement wherein said core part is comprised of a glass composition capable of having its surface portion crystallized to form luminescent crystals, the ends of said core part at the radiation-receiving face being crystallized.

2. In a fiber optical image transfer device comprising a plurality of light-conducting optical fibers secured together in side-by-side relation so that corresponding opposite ends of the fibers cooperate to define respective radiation-receiving and light-emitting faces, each of said fibers having a core part of a transparent material of relatively high index of refraction and a cladding of relatively low index of refraction, the improvement wherein said core part is comprised of at least partially crystallized luminescent glass composition having its radiation-receiving end portion crystallized into a visible-light-generating phosphor.

3. A cathode-ray tube face plate comprising a plurality of light-conducting optical fibers secured together in side-by-side relation so that corresponding opposite ends of the fibers cooperate to define respective radiation-receiving and light-emitting faces, each of said fibers having a core part of a cathodoluminescent transparent material of relatively high index of refraction and a cladding of relatively low index of refraction encircling said core part, at least one end portion of said core part being in luminescent crystallized form.

4. A cathode-ray tube face plate comprising a plurality of light-conducting optical fibers secured together in side-by-side relation so that corresponding opposite ends of the fibers cooperate to define respective radiation-receiving and light-emitting faces, each of said fibers having a core part of a transparent material of relatively high index of refraction and a cladding of relatively low index of refraction encircling said core part, the ends of said core part at the radiation-receiving face being formed of luminescent crystals and the remainder being vitreous and visible-light transmitting.

5. For use in a cathode-ray tube an improved face plate comprising a multiplicity of glass fibers arranged in an ordered array, said glass fibers being formed of a core glass having a relatively high index of refraction and being capable of devitrifying to a phosphor and a cladding having a relatively low index of refraction encircling said core glass to form a unitary structure having an inner surface and an outer surface, said core glass extending from said inner to said outer surface and having the ends thereof at the inner surface devitrified to a phosphor with the remainder in vitreous light-transmitting condition.

References Cited
UNITED STATES PATENTS

| | | | |
|---|---|---|---|
| 3,225,193 | 12/1965 | Hilton et al. | 250—71.5 |
| 3,237,039 | 2/1966 | Eyler | 313—92 |

JAMES W. LAWRENCE, *Primary Examiner.*

V. LAFRANCHI, *Assistant Examiner.*